United States Patent
Chen et al.

(10) Patent No.: US 11,336,943 B2
(45) Date of Patent: May 17, 2022

(54) METHOD AND ELECTRONIC DEVICE FOR DETECTING RESOLUTION

(71) Applicant: REALTEK SEMICONDUCTOR CORPORATION, Hsinchu (TW)

(72) Inventors: Ching-Lung Chen, Hsinchu (TW); Yu-Che Kao, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 23 days.

(21) Appl. No.: 17/134,580

(22) Filed: Dec. 28, 2020

(65) Prior Publication Data
US 2021/0266622 A1 Aug. 26, 2021

(30) Foreign Application Priority Data
Feb. 24, 2020 (TW) ................................ 109105918

(51) Int. Cl.
| | | |
|---|---|---|
| *H04N 21/44* | (2011.01) | |
| *H04N 21/2662* | (2011.01) | |
| *H04N 21/25* | (2011.01) | |
| *G06T 3/40* | (2006.01) | |

(52) U.S. Cl.
CPC .......... *H04N 21/2662* (2013.01); *G06T 3/40* (2013.01); *G06T 3/4046* (2013.01); *H04N 21/251* (2013.01); *H04N 21/44008* (2013.01)

(58) Field of Classification Search
CPC ............. H04N 21/2662; H04N 21/251; H04N 21/44008; H04N 21/4318; H04N 21/4666; G06T 3/04
See application file for complete search history.

(56) References Cited

U.S. PATENT DOCUMENTS

| | | | | |
|---|---|---|---|---|
| 6,014,121 A | * | 1/2000 | Aratani | G09G 3/3607 345/87 |
| 2006/0013499 A1 | * | 1/2006 | Namie | G06T 3/4007 382/254 |
| 2013/0265311 A1 | * | 10/2013 | Na | G06T 3/40 345/428 |

(Continued)

FOREIGN PATENT DOCUMENTS

| | | | | |
|---|---|---|---|---|
| CN | 102622991 A | * | 8/2012 | |
| CN | 106530227 A | * | 3/2017 | ........... G06K 9/6217 |

(Continued)

*Primary Examiner* — Robert J Hance
(74) *Attorney, Agent, or Firm* — WPAT, PC

(57) ABSTRACT

A method and an electronic device for detecting the resolution of a video material are provided. The method is applied to an electronic device, and a calculation circuit of the electronic device executes an AI model. The video material includes multiple frames, and each frame includes multiple sub-frames. The AI model processes multiple pixel data to generate an intermediate resolution corresponding to the pixel data. The method includes the following steps: (A) generating a target sub-frame, the number of pixels of the target sub-frame being smaller than the number of pixels in any frame; (B) inputting the target sub-frame into the AI model to generate the intermediate resolution; (C) storing the intermediate resolution; (D) repeating steps (A) to (C) to generate multiple intermediate resolutions; and (E) determining the resolution of the video material based on the intermediate resolutions.

20 Claims, 11 Drawing Sheets

(56) References Cited

U.S. PATENT DOCUMENTS

| | | | | |
|---|---|---|---|---|
| 2015/0178895 A1* | 6/2015 | Owaki | ............... | G06V 10/44 |
| | | | | 382/195 |
| 2015/0278991 A1* | 10/2015 | Kodavalla | ............ | G06T 3/4023 |
| | | | | 345/660 |
| 2016/0027148 A1* | 1/2016 | Choudhury | ............ | G06T 5/50 |
| | | | | 382/254 |
| 2017/0206632 A1* | 7/2017 | Milanfar | ............... | G06T 5/50 |
| 2020/0160528 A1* | 5/2020 | Rhodes | ............... | G06V 20/49 |

FOREIGN PATENT DOCUMENTS

| | | | | |
|---|---|---|---|---|
| CN | 107295362 A * | 10/2017 | ........... | G06F 16/783 |
| KR | 101791917 B1 * | 11/2017 | ......... | H04N 13/0454 |
| WO | WO-2008029750 A1 * | 3/2008 | ..... | H04N 21/440272 |

* cited by examiner

METHOD AND ELECTRONIC DEVICE FOR DETECTING RESOLUTION

BACKGROUND OF THE INVENTION

1. Field of the Invention

The present invention generally relates to image processing technologies, and, more particularly, to the technologies for detecting the resolution of video materials.

2. Description of Related Art

Some of the present electronic devices (e.g., TVs, monitors, multimedia players, set-top boxes, mobile phones, computers, notebooks, tablets, etc.) can play or process Ultra-High-Definition (UHD) video materials. However, these high-resolution video materials may be generated by scaling up low-resolution video materials. In other words, the original resolution of such high-resolution video materials before scaling-up can be low.

In order to improve the image quality, the electronic devices usually perform different picture quality functions on the video materials according to the original resolutions of the video materials. Conventionally, the resolution of a video material is detected by monitoring the update frequency of the pixel values of the video material. This approach, however, requires specially designed hardware and algorithms, resulting in lack of flexibility in implementations.

With the development of artificial intelligence (AI), more and more image processing-related machine learning algorithms or deep learning algorithms have been proposed. Neural Networks (NNs) or Convolutional Neural Networks (CNNs) are two AI models widely used in image processing. Currently, there are AI models that have been trained to detect the original resolutions of video materials (please refer to: github.com/subpic/koniq). However, higher nominal resolution of the video material means higher workload for the AI model, and it consumes more time on the resolution detection process. It reduces the performance of the electronic device since the resolution detection procedures keep occupying the hardware (e.g., the central processing unit (CPU), graphics processing unit (GPU)) that executes the AI model.

SUMMARY OF THE INVENTION

In view of the issues of the prior art, an object of the present invention is to provide a method and an electronic device for detecting the resolution, so as to make an improvement to the prior art.

A method of detecting a resolution of a video material is provided. The method is applied to an electronic device. A calculation circuit of the electronic device executes an artificial intelligence (AI) model. The video material includes a plurality of frames, and each frame contains a plurality of sub-frames. The AI model processes a plurality of pixel data to generate an intermediate resolution corresponding to the pixel data. The method includes the following steps: (A) generating a target sub-frame, the number of pixels in the target sub-frame being smaller than the number of pixels in any of the frames; (B) inputting the target sub-frame into the AI model to generate the intermediate resolution; (C) storing the intermediate resolution; (D) repeating steps (A) to (C) to generate a plurality of intermediate resolutions; and (E) determining the resolution of the video material based on the intermediate resolutions.

An electronic device for detecting a resolution of a video material is provided. The video material includes a plurality of frames, and each frame contains a plurality of sub-frames. The electronic device includes a storage circuit and a calculation circuit. The storage circuit stores a plurality of program instructions or program codes. The calculation circuit is coupled to the storage circuit and executes the program instructions or program codes to execute an artificial intelligence model. The AI model processes a plurality of pixel data to generate an intermediate resolution corresponding to the pixel data. The calculation circuit further executes the program instructions or program codes to perform following steps: (A) generating a target sub-frame, the number of pixels in the target sub-frame being smaller than the number of pixels in any of the frames; (B) inputting the target sub-frame into the AI model to generate the intermediate resolution; (C) storing the intermediate resolution; (D) repeating steps (A) to (C) to generate a plurality of intermediate resolutions; and (E) determining the resolution of the video material based on the intermediate resolutions.

A method of detecting a resolution of a video material is also provided. The method is applied to an electronic device which includes a calculation circuit and a storage circuit. The storage circuit stores a plurality of program instructions or program codes, and the calculation circuit executing the program instructions or program codes to execute a first artificial intelligence model which includes a plurality of sub-models. The method includes the following steps: (A) obtaining a frame of the video material; (B) inputting the frame into a target sub-model of the sub-models to generate a first intermediate result; (C) storing the first intermediate result; (D) using the calculation circuit to execute a second AI model; (E) taking a sub-model succeeding the target sub-model as the target sub-model; (F) inputting the first intermediate result into the target sub-model to generate a second intermediate result or the resolution of the video material; and (G) using the second intermediate result as the first intermediate result and repeating steps (C) to (F) until step (F) generates the resolution of the video material, when step (F) generates the second intermediate result instead of the resolution of the video material.

According to the present invention, the method and electronic device for detecting resolutions do not occupy the software and hardware resources of the electronic device for a long time. In comparison with the traditional technology, the present invention can increase the performance of the electronic device (e.g., as a result of decreasing the demand for the bandwidth of the storage circuit or memory and/or reducing calculation amount).

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly.

The disclosure herein includes methods and an electronic device for detecting resolutions. On account of that some or all elements of the electronic device could be known, the detail of such elements is omitted provided that such detail has little to do with the features of this disclosure, and that this omission nowhere dissatisfies the specification and enablement requirements. Some or all of the processes of the resolution detection methods may be implemented by software and/or firmware and can be performed by the electronic device or its equivalent. A person having ordinary skill in the art can choose components or steps equivalent to those described in this specification to carry out the present invention, which means that the scope of this invention is not limited to the embodiments in the specification.

Figure 1:
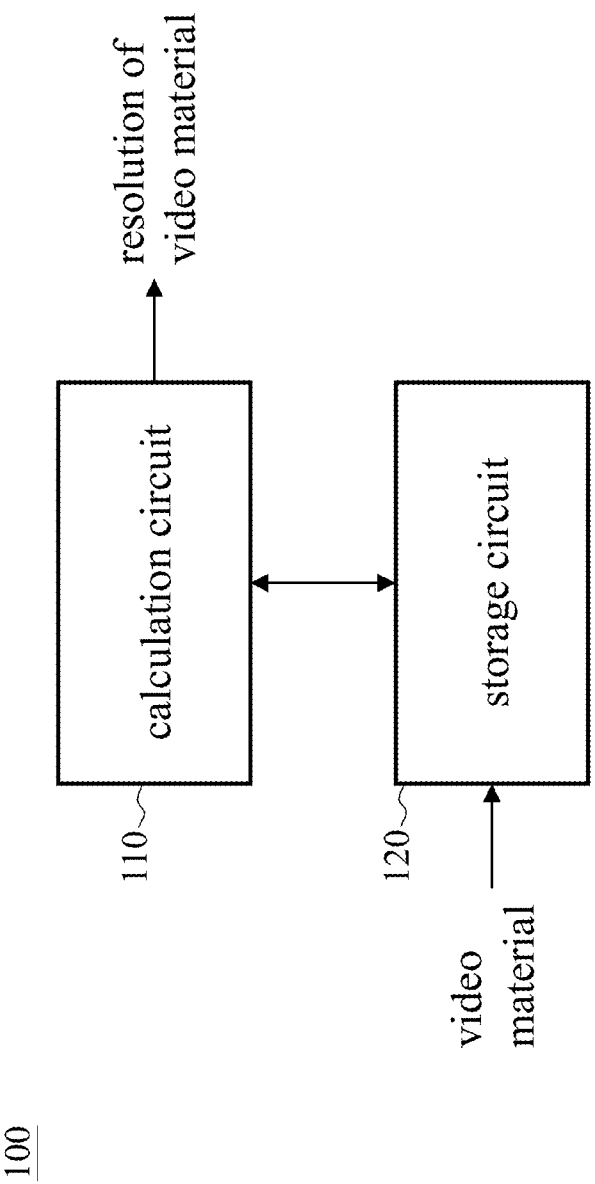
FIG. 1 shows some components of the electronic device of the present invention.

FIG. 1 shows some of the components of the electronic device according to the present invention. The electronic device 100 includes a calculation circuit 110 and a storage circuit 120. The storage circuit 120 can store some of (or part of) the video materials and the video materials includes multiple frames. In some embodiments, the storage circuit 120 includes multiple line buffers for storing the entire frame or a part of the frame. The storage circuit 120 may be a dynamic random access memory (DRAM), a static random access memory (SRAM), their equivalent hardware, or a combination of multiple types of memories. The storage circuit 120 further stores multiple program instructions, AI model parameters and other parameters, and the calculation circuit 110 uses these program instructions, AI model parameters and other parameters to execute the AI model (which includes, but not limited to, Neural Networks (NNs) or Convolutional Neural Network (CNNs)) and to execute the methods of detecting the resolution of video materials. For example, the electronic device 100 may be, but not limited to, a TV, a monitor, a multimedia player, a set-top box, a mobile phone, a computer, a notebook, a tablet or the like.

The calculation circuit 110 may be a circuit or an electronic component with program execution capabilities, such as a central processing unit (CPU), a graphics processing unit (GPU), or an application specific integrated circuit (ASIC). The ASIC may be, for example, an AI model accelerator.

Figure 2:
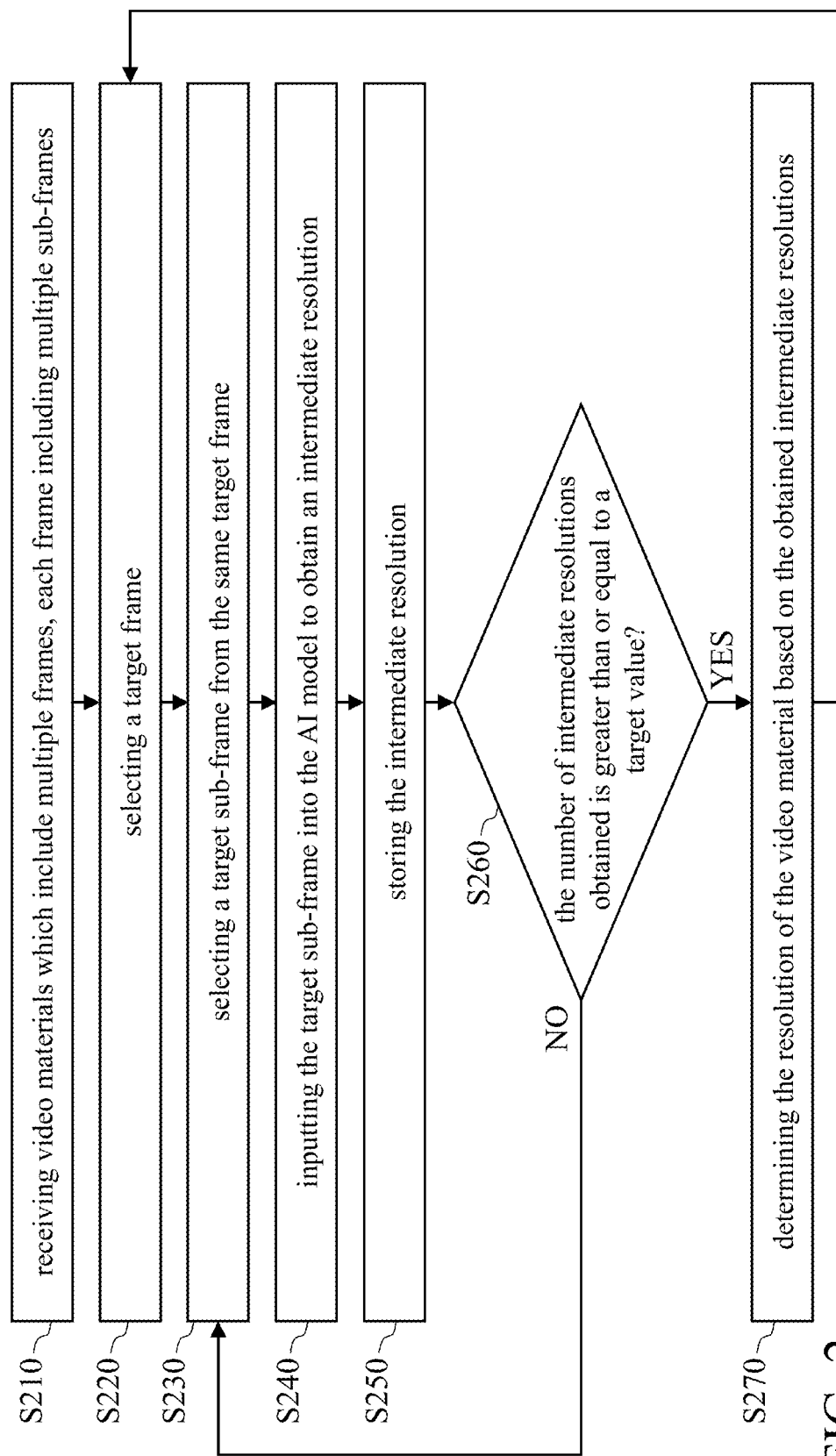
FIG. 2 shows a flowchart of the method of detecting the resolution of video materials according to an embodiment of the present invention.

FIG. 2 shows a flowchart of the method of detecting the resolution of video materials according to an embodiment of the present invention. The electronic device 100 receives the video materials (step S210). The video materials include multiple frames, and each frame includes multiple sub-frames. Next, the calculation circuit 110 selects a target frame from multiple frames (step S220), for example, the target frame can be the frame that the electronic device 100 is receiving. Then, the calculation circuit 110 selects a target sub-frame from the same target frame (step S230).

Figure 3:
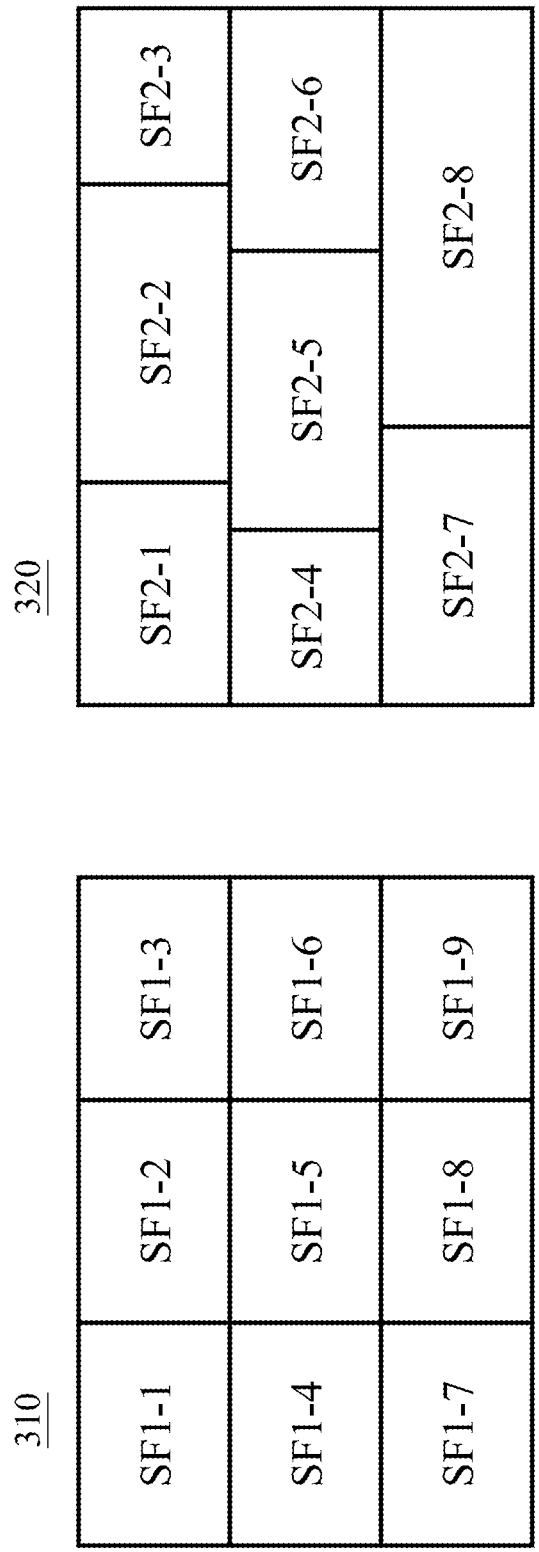
FIGS. 3A and 3B respectively show a frame which includes multiple sub-frames.

FIGS. 3A and 3B respectively show a frame which includes multiple sub-frames. The frame 310 includes nine sub-frames (SF1-1, SF1-2, SF1-3, SF1-9), and each sub-frame are the same in size. The frame 320 includes eight sub-frames (SF2-1, SF2-2, SF2-3, SF2-8), and the eight sub-frames have various sizes. In some embodiments, in step S230, the calculation circuit 110 selects the sub-frame SF1-1 or the sub-frame SF2-1 as the target sub-frame. In the example of FIG. 3A, each time the calculation circuit 110 performs step S230, it selects the target sub-frame of the same size, whereas in the example of FIG. 3B, the target sub-frames that are each selected in different steps S230 are not necessarily the same in size. The numbers of sub-frames in FIG. 3A and FIG. 3B serve merely as examples, and those who implement this invention can decide the number of sub-frames according to the practical application.

Reference is made to FIG. 2. After determining the target sub-frame, the calculation circuit 110 inputs the target sub-frame into the AI model to obtain an intermediate resolution corresponding to the target sub-frame (step S240). In other words, the AI model uses multiple pixel data of the target sub-frame as input data, and then calculates or determines the resolution of the target sub-frame based on the pixel data. In some embodiments, the number of pixels in the sub-frame is, for example, greater than or equal to 5% of the number of pixels in the frame.

After the AI model generates the intermediate resolution, the calculation circuit 110 stores the intermediate resolution (step S250), for example, storing the intermediate resolution in a specific storage space or a specific location of the storage circuit 120. After step S250 is finished, the calculation circuit 110 determines whether the number of intermediate resolutions obtained is greater than or equal to a target value (step S260). When the number of intermediate resolutions obtained is greater than or equal to the target value, the calculation circuit 110 determines the resolution of the video material by analyzing the obtained intermediate resolutions (step S270). When the number of intermediate resolutions is smaller than the target value, the calculation circuit 110 selects another target sub-frame from the same target frame (i.e., the current target frame) (step S230), and then repeats steps S230 to S250 until step S260 is determined positive (YES branch).

In some embodiments, the target value is the number of sub-frames in a frame. In other words, it is not until the calculation circuit 110 has inputted all the sub-frames of a frame into the AI model that the resolution of the frame is obtained. For the examples in FIGS. 3A and 3B, the target value corresponding to the frame 310 is nine, while the target value corresponding to the frame 320 is eight.

In other embodiments, the target value is smaller than the number of sub-frames in a frame. In other words, to determine the resolution of the frame, the calculation circuit 110 needs to only input some, not all, of the sub-frames of the frame into the AI model.

In some embodiments, the intermediate resolution obtained in step S240 may belong to one of several categories (e.g., high, medium and low), and the user can define the practical resolution represented by each category. For example, the high, medium and low intermediate resolutions may correspond to 4K, 2K and 1080P, respectively. In some embodiments, in step S270, the calculation circuit 110 uses the mode of the intermediate resolutions as the resolution of the frame. If there is more than one mode, the calculation circuit 110 takes any mode as the resolution of the frame. Because in most cases the resolution of the video material rarely changes, the process in FIG. 2 is equivalent to detecting or determining the resolution of the video material. After step S270 is finished, the calculation circuit 110 deletes the intermediate resolutions that have been stored, and then either ends the process of FIG. 2 (i.e., stops detecting the resolution of the video material) or return to step S220 to continue the detection of the resolution of the video material. If the calculation circuit 110 continues the detection of the resolution of the video material, it selects, in step S220, another target frame different from the previous target frame.

Figure 4:
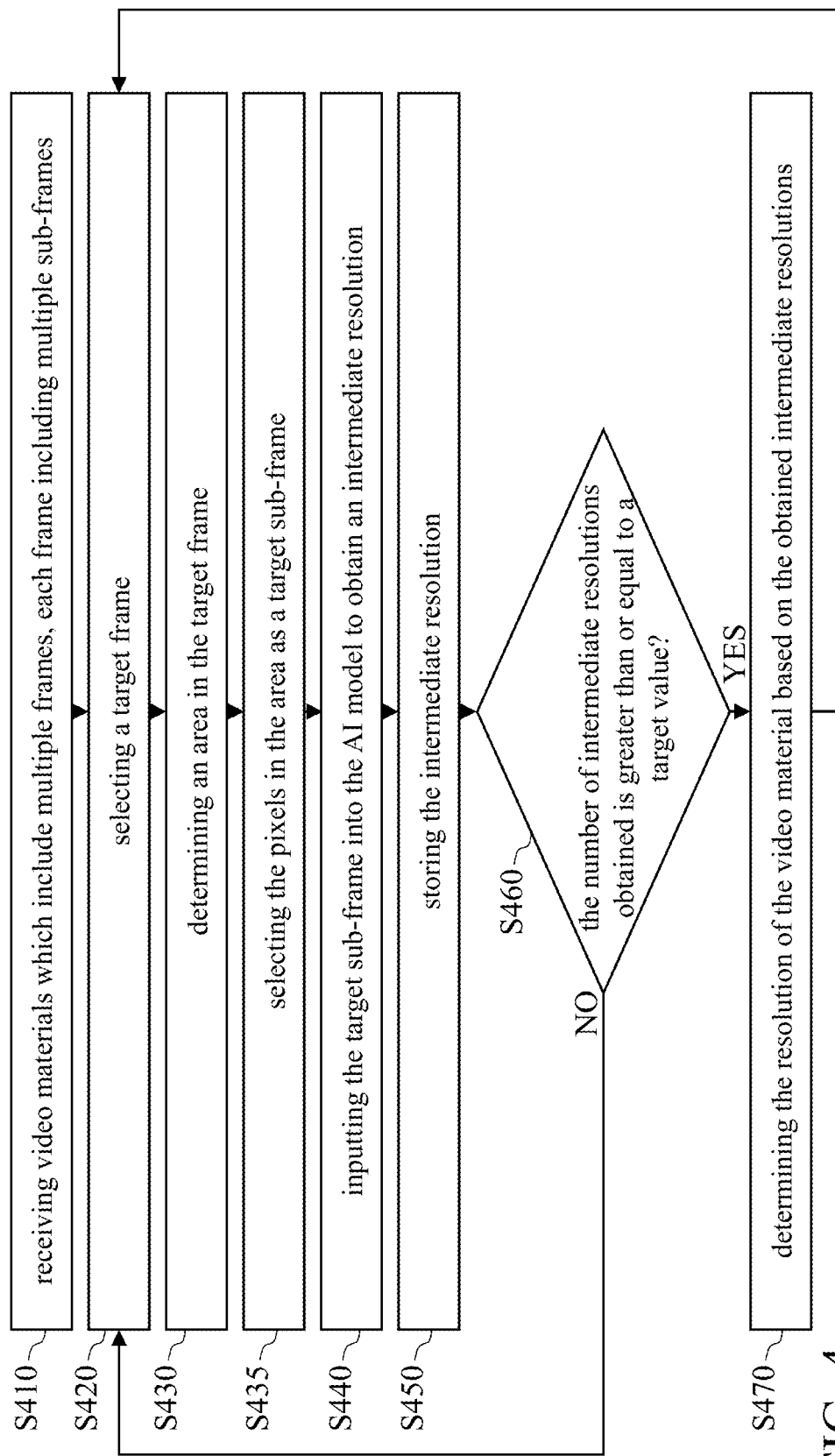
FIG. 4 shows a flowchart of the method of detecting the resolution of video materials according to another embodiment the present invention.
Figure 5:
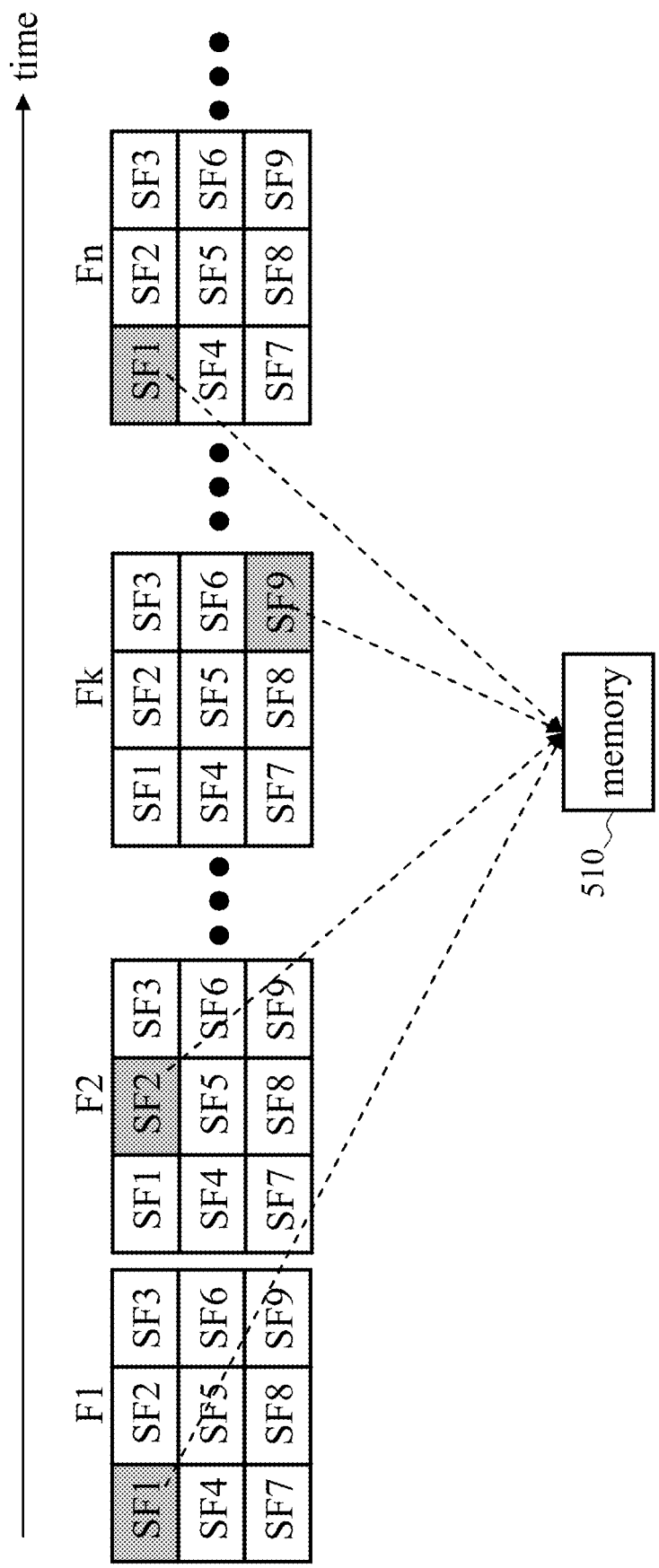
FIG. 5 shows the frames, sub-frames and memory corresponding to the embodiment of FIG. 4.

FIG. 4 shows a flowchart of the method of detecting the resolution of video materials according to another embodiment the present invention. FIG. 5 shows the frames, sub-frames and memory corresponding to the embodiment of FIG. 4. Step S410 and step S420 in FIG. 4 are identical to the step S210 and step S220 in FIG. 2 respectively, so the details are omitted for brevity. In step S430, the calculation circuit 110 determines an area in the target frame. The memory 510 in FIG. 5 is a part of the storage circuit 120 and used for storing sub-frames.

Reference is made to FIG. 5, which shows that the video materials includes multiple frames (F1, F2, Fk, Fn, 1≤k≤n), and each frame includes nine sub-frames (SF1, SF2, SF3, SF9). Note that the number of sub-frames is intended to illustrate the invention by way of examples, rather than to limit the scope of the claimed invention. Each sub-frame of a frame corresponds to an area of the frame. Each area can be represented by its coordinates in (i.e., with respect to) the frame. In the example of FIG. 5, when the target frame determined in step S420 is the frame F1, the area determined in step S430 is the area corresponding to the sub-frame SF1 (represented in gray); when the target frame determined in step S420 is the frame F2, the area determined in step S430 is the area corresponding to the sub-frame SF2; when the target frame determined in step S420 is the frame Fk, the area determined in step S430 is the area corresponding to the sub-frame SF9; and when the target frame determined in step S420 is the frame Fn, the area determined in step S430 is the area corresponding to the sub-frame SF1. In some embodiments, the two areas determined in two consecutive steps S430 have different positions or coordinates. For example, the position or coordinates of the sub-frame SF1 of the frame F1 is/are different from the position or coordinates of the sub-frame SF2 of the frame F2.

After determining the area, the calculation circuit 110 selects the pixels in the area as the target sub-frame (step S435). In other words, the target sub-frame includes all the pixels in the selected area, which pixels are stored in the memory 510. That is, the target sub-frame is made up of all the pixels in the area. In some embodiments, step S430 and step S435 may together be deemed equivalent to selecting a target sub-frame from the target frame. In some embodiments, the memory 510 may be designed or configured to store just one sub-frame for the purpose of saving hardware resources.

After step S435 is finished, the calculation circuit 110 executes steps S440-S470 to obtain the resolution of the video material. Since steps S440, S450, S460 and S470 are identical to the steps S240, S250, S260 and S270 respectively, their details are omitted for brevity.

In the embodiments of FIGS. 4 and 5, before the resolution of the video material is obtained, the calculation circuit 110 has executed step S420 several times (i.e., having determined or selected multiple target frames, such as the frames F1, F2, etc. in FIG. 5.) and steps S430 to S435 several times (i.e., having determined or selected multiple sub-frames, such as the sub-frame SF1 of the frame F1, the sub-frame SF2 of frame F2, etc. in FIG. 5). Note that in the course of generating the resolution of the video material once (i.e., steps S420-S460 having been performed multiple times), at least one area determined in step S430 is different from another area determined in the immediately preceding step S430. For example, as shown in FIG. 5, two consecutive steps S430 respectively determine the area corresponding to the sub-frame SF1 of the frame F1 and the area corresponding to the sub-frame SF2 of the frame F2.

Figure 6:
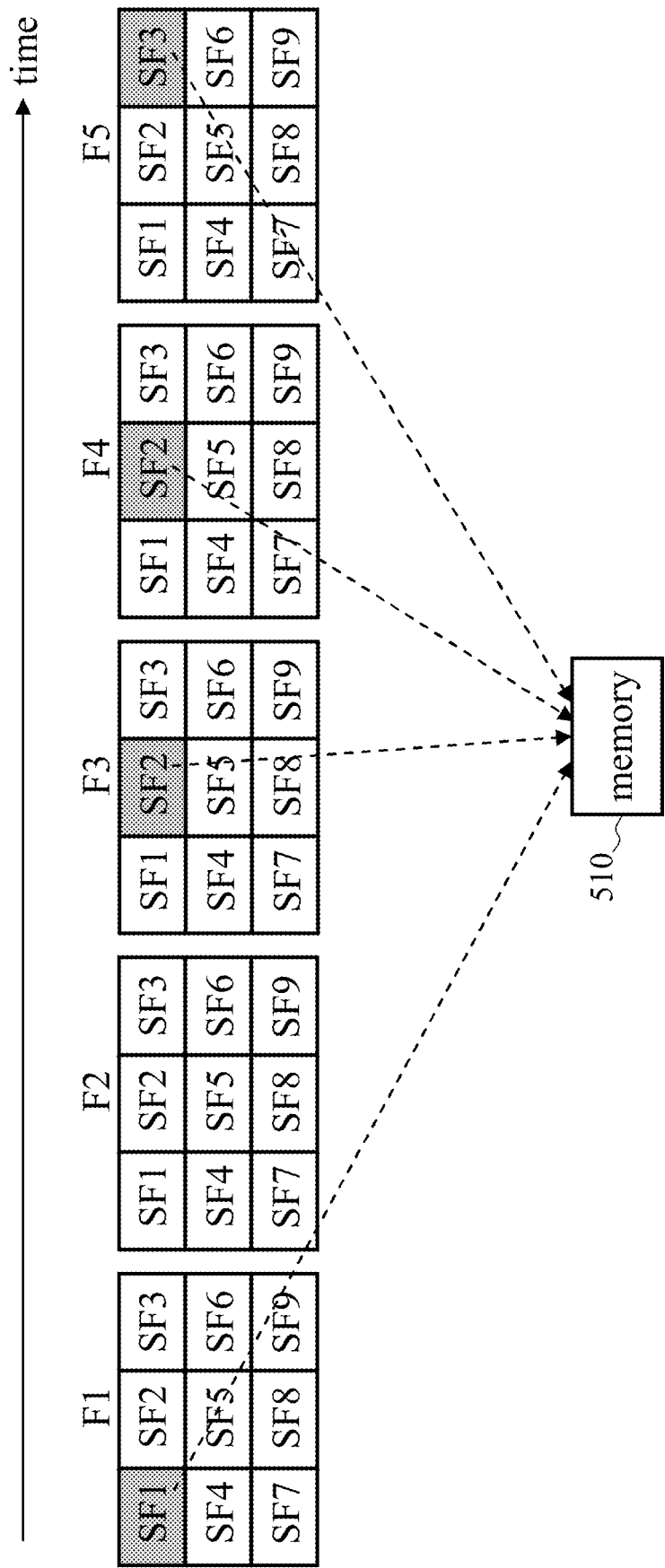
FIG. 6 shows the frames and sub-frames of another example corresponding to the flow of FIG. 4.

FIG. 6 shows the frames and sub-frames of another example corresponding to the flow of FIG. 4. The frames F1, F2, F3, F4 and F5 in FIG. 6 are contiguous frames. In this example, in steps S420, the calculation circuit 110 may not select contiguous frames. For example, the frame F2 is not selected as the target frame (which means that the selected frames F1 and F3 are not contiguous). In addition, in this example, the calculation circuit 110 may determine the same area in two consecutive steps S430. For example, the determined areas in the frames F3 and F4 are the same area corresponding to the sub-frame SF2.

In comparison with the embodiment of FIG. 2, the embodiment of FIG. 4 requires fewer pixels to be stored at the same time. In other words, the embodiment of FIG. 4 occupies less storage circuit 120. More specifically, assuming that the embodiment of FIG. 2 and the embodiment of FIG. 4 use sub-frames of the same size (say, q pixels) and have the same target value (say, p), data of q×p pixels are stored at the same time for the embodiment of FIG. 2, whereas data of q pixels are stored at the same time for the embodiment of FIG. 4.

Figure 7:
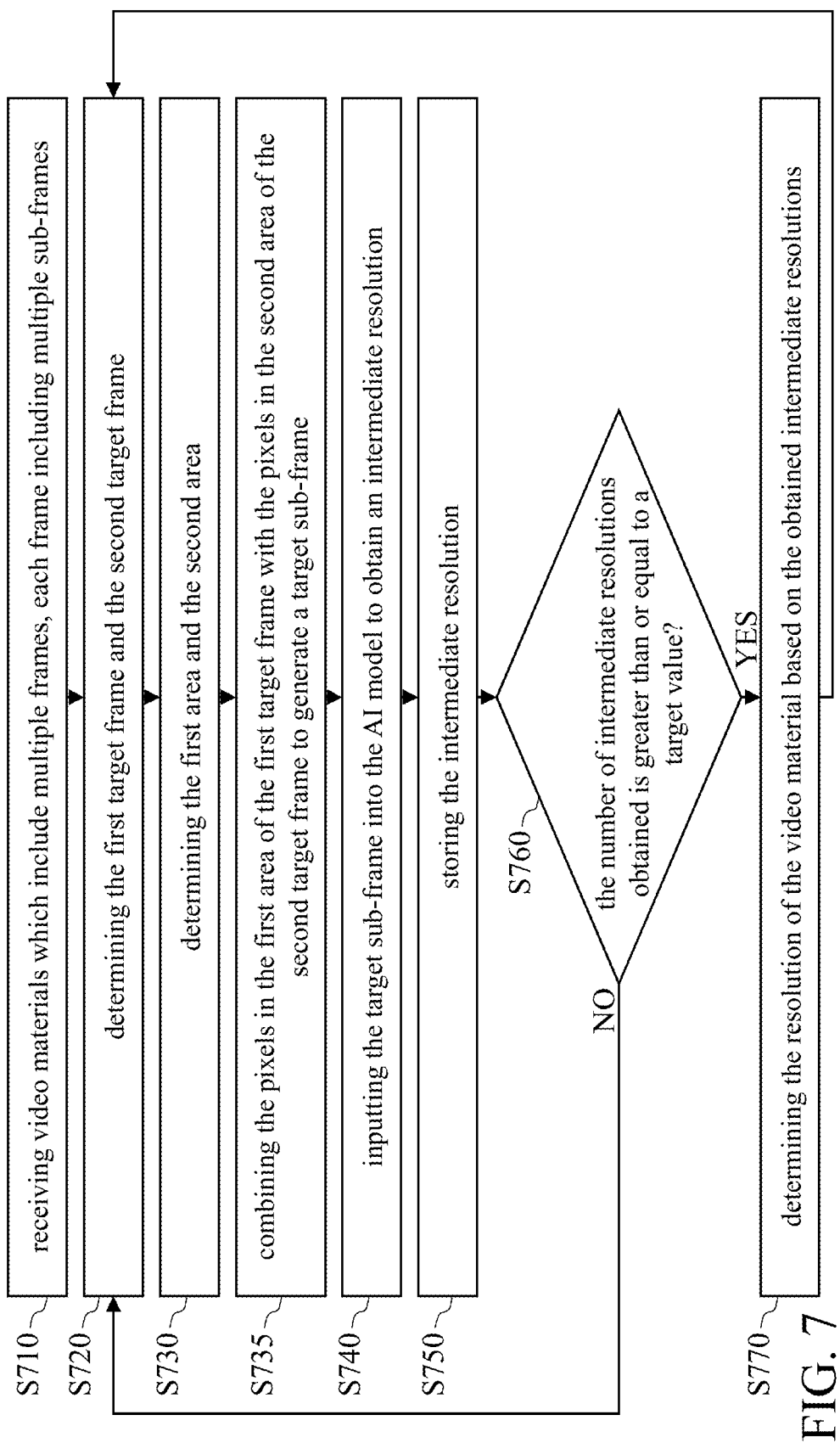
FIG. 7 shows a flowchart of the method of detecting the resolution of video materials according to another embodiment of the present invention.
Figure 8:
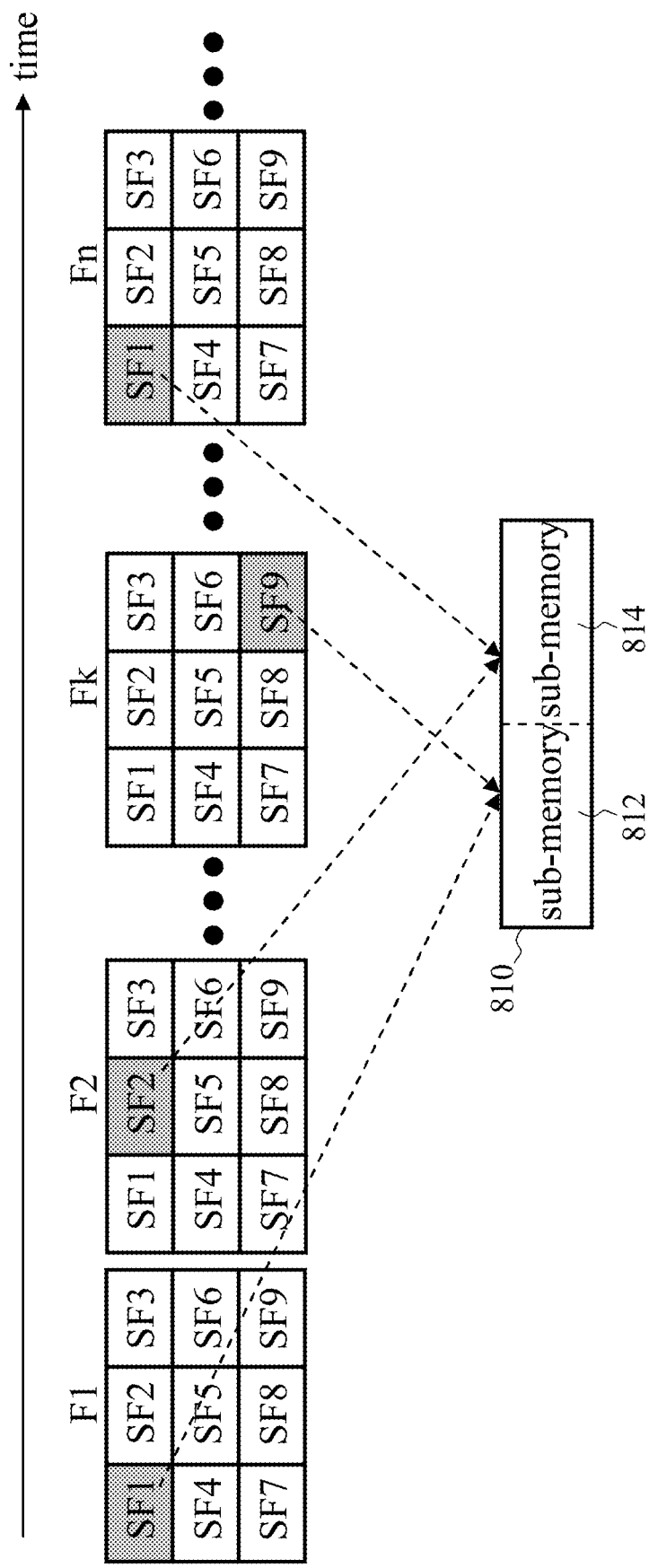
FIG. 8 shows the frames, sub-frames and memory corresponding to the embodiment of FIG. 7.

FIG. 7 shows a flowchart of the method of detecting the resolution of video materials according to another embodiment of the present invention. FIG. 8 shows the frames, sub-frames and memory corresponding to the embodiment of FIG. 7. Steps S710, S740, S750, S760 and S770 in FIG. 7 are identical to the steps S210, S240, S250, S260 and S270 in FIG. 2 respectively, so the details are omitted for brevity. In step S720, the calculation circuit 110 determines the first target frame and the second target frame, which are, for example, the frame F1 and the frame F2, respectively. In step S730, the calculation circuit 110 determines the first area and the second area, which are, for example, the area corresponding to the sub-frame SF1 (represented in gray) and the area corresponding to the sub-frame SF2 (represented in gray), respectively. In step S735, the calculation circuit 110 combines the sub-frame SF1 of the frame F1 (i.e., the pixels in the first area of the first target frame) with the sub-frame SF2 of the frame F2 (i.e., the pixels in the second area of the second target frame) to generate the target sub-frame. In other words, the sub-frame of this embodiment includes multiple pixels from the first frame and multiple pixels from the second frame.

The memory 810 in FIG. 8 is a part of the storage circuit 120 and used for storing sub-frames. In some embodiments, the memory 810 can be regarded as including two sub-memories: the sub-memory 812 and the sub-memory 814. The sub-memory 812 is used for storing the pixels in the first area of the first frame, and the sub-memory 814 is used for storing the pixels in the second area of the second frame.

In some embodiments, the first frame and the second frame are contiguous frames (e.g., the frame F1 and the frame F2 in FIG. 8). In other embodiments, the first frame and the second frame are not contiguous frames (e.g., the frame F1 and the frame F3 in FIG. 6).

For a given target value (i.e., the number of sub-frames processed being the same), the embodiment of FIG. 7 can use the pixel values from more frames as references than the embodiment of FIG. 4 in the determination of the resolution of the video material. In some applications, the embodiment of FIG. 7 may obtain a more accurate resolution than the embodiment of FIG. 4.

In some embodiments, the size of the first area is the same as the size of the second area, and each is half the size of the area used in the embodiment of FIG. 4. As a result, the size of the sub-frame in the embodiment of FIG. 7 is identical to the size of the sub-frame in the embodiment of FIG. 4; that is, the storage capacity of the memory 810 is the same as that of the memory 510.

In the methods of FIGS. 2, 4 and 7, since the AI model processes fewer data (e.g., only one sub-frame, as opposed to an entire frame) at a time, a long time occupation of the AI model does not occur, preventing the electronic device 100 from perform poorly due to long-time execution of the same operation or task. In addition, because the flows of FIGS. 2, 4 and 7 can stop for a while and then resume (e.g., after step S250/S450/S750 is finished, the calculation circuit 110 uses the AI model to perform another operation or task, and then goes on with the resolution detection operation from step S260/S460/S760), the design or operation flexibility of the electronic device 100 is improved.

Figure 9:
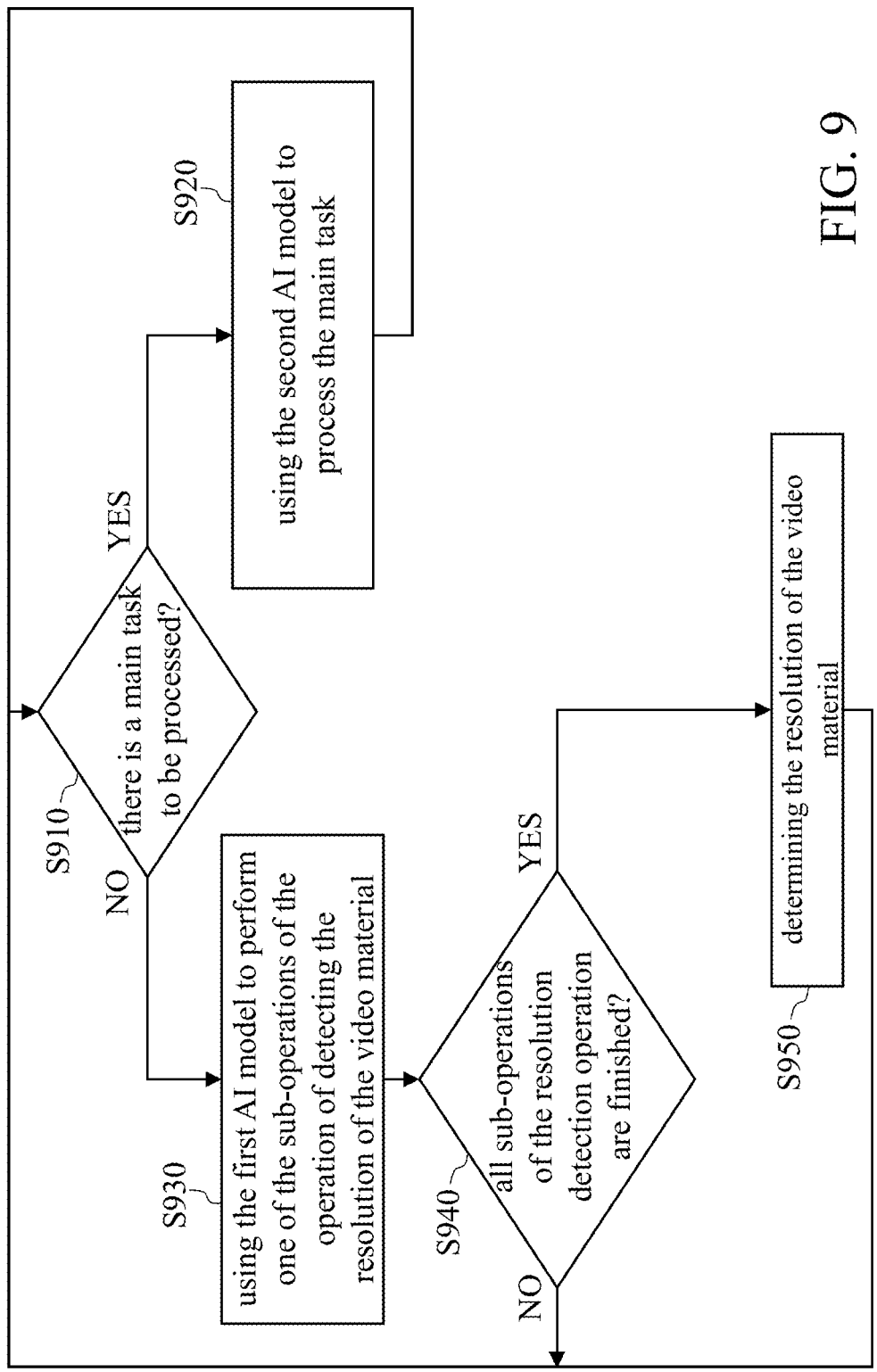
FIG. 9 shows a flowchart of the method of detecting the resolution of video materials according to another embodiment of the present invention.

In some cases, in addition to the AI model (hereinafter referred to as the first AI model) used for detecting the resolutions of video materials, the electronic device 100 may execute another AI model (hereinafter referred to as the second AI model) to handle tasks that may be critical in time or highly important (hereinafter referred to as main tasks), such as object recognition (including but not limited to face recognition). FIG. 9 shows a flowchart of the method of detecting the resolution of video materials according to another embodiment of the present invention. The program instructions, the first and second AI model parameters and other parameters that are used for implementing the flow of FIG. 9 are also stored in the storage circuit 120 and executed by the calculation circuit 110. When determining that there is a main task to be processed (YES branch of step S910), the calculation circuit 110 executes the second AI model stored in the storage circuit 120 to process the main task (step S920). After step S920 is finished, the flow goes back to step S910. When determining that there is no main task to be processed at present (NO branch of step S910), the calculation circuit 110 uses the first AI model stored in the storage circuit 120 to perform one of the sub-operations of the operation of detecting the resolution of the video material (step S930). After step S930 is finished, the calculation circuit 110 determines whether all sub-operations of the resolution detection operation are finished (step S940). When step S940 is determined to be NO, the calculation circuit 110 proceeds to determine whether there is a main task to be processed at present (step S910). When step S940 is determined to be YES, the calculation circuit 110 determines the resolution of the video material (step S950).

In some embodiments, the sub-operation discussed in step S930 may be the operation of generating an intermediate resolution in the embodiments of FIGS. 2, 4 and 7, the details of step S940 are to determine whether the number of stored intermediate resolutions is greater than or equal to the target value, and the details of step S950 are the same as those of step S270. In other words, step S930 can be equivalent to steps S210 to S250 in FIG. 2 (wherein steps S210 and S220 only need to be performed once), to steps S410 to S450 in FIG. 4 (wherein step S410 only needs to be performed once), or to steps S710 to S750 in FIG. 7 (wherein step S710 only needs to be performed once). Because step S930 processes some of the pixels, instead of all pixels, of a frame, the calculation circuit 110 can use the same AI model accelerator to perform the resolution detection operation between two main tasks without affecting the main tasks. In other words, according to the embodiments of FIGS. 2, 4 and 7, a single AI model accelerator can be used for both real-time tasks (such as the main tasks) and non-real-time tasks (such as the resolution detection operations); therefore, the performance and usage flexibility of the electronic device 100 are improved.

Figure 10:
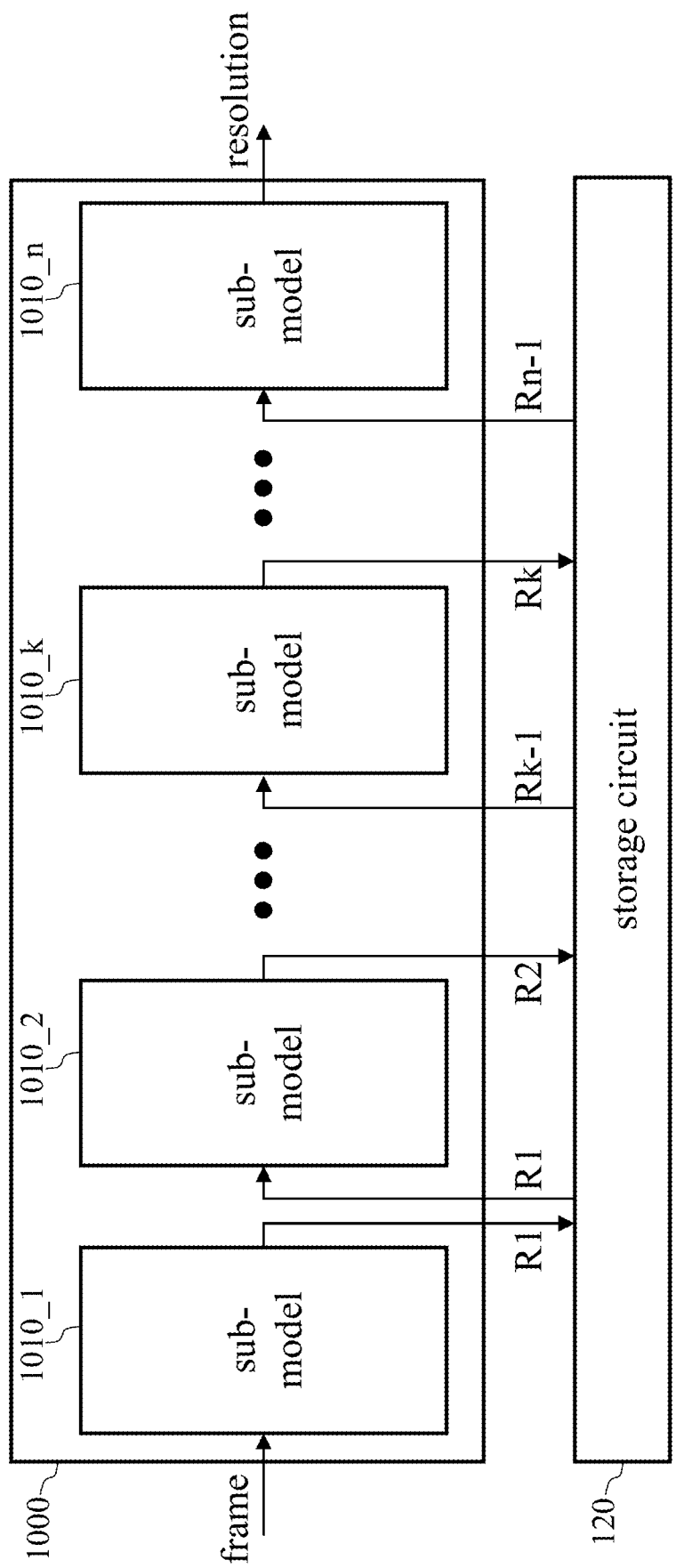
FIG. 10 shows an AI model which includes multiple sub-models.

In other embodiments, the sub-operation discussed in step S930 is a sub-model of the first AI model. Reference is made to FIG. 10, which shows that the first AI model includes multiple sub-models. The first AI model 1000 includes the sub-model 1010_1, the sub-model 1010_2, . . . , the sub-model 1010_k, . . . , and the sub-model 1010_n (2≤n, 2≤k≤n). The first sub-model 1010_1 receives and processes the frame and generates the intermediate result R1. The calculation circuit 110 does not directly input the intermediate result R1 into the next sub-model 1010_2 but rather stores it in the storage circuit 120. The last sub-model 1010_n uses the intermediate result of the preceding sub-model as its input and generates the resolution of the frame. The sub-models in the middle (i.e., the sub-models other than the first sub-model 1010_1 and the last sub-model 1010_n) each use the intermediate result of their respective preceding sub-model as their inputs and generate intermediate results. In some embodiments, the intermediate results R1, R2, . . . , Rk−1, Rk, Rn−1 include the feature map(s), hidden layer output(s) and other parameter(s) generated by the first AI model 1000 during the calculation. In some embodiments, the first AI model 1000 may be a combination of a decoder model, an encoder model and a WaveNet model (please refer to the website for more details: github.com/Rayhane-mamah/Tacotron-2).

Figure 11:
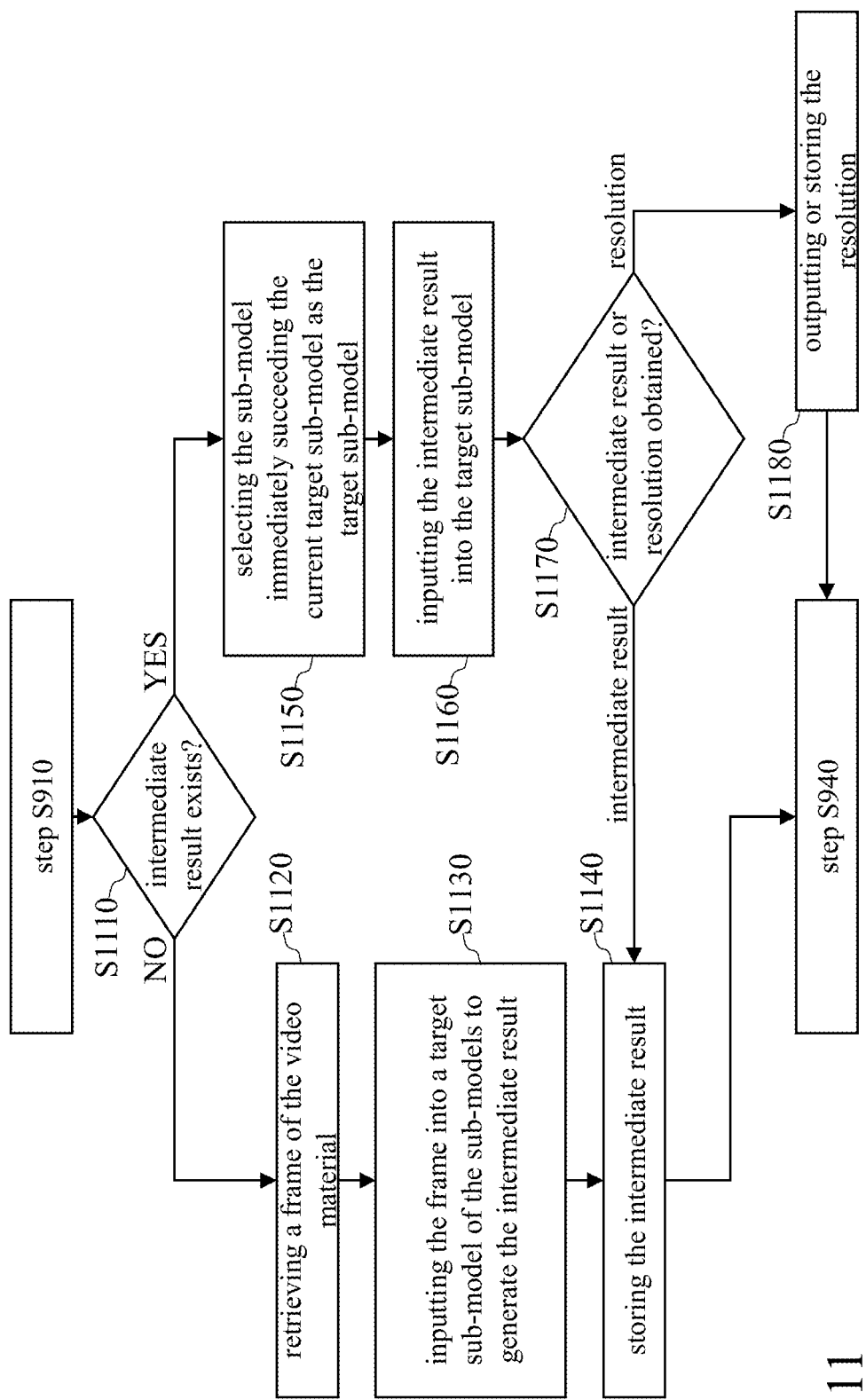
FIG. 11 shows the sub-steps of step S930 (corresponding to the embodiment of FIG. 10).

FIG. 11 shows the sub-steps of step S930 corresponding to this embodiment. First, the calculation circuit 110 determines whether an intermediate result has been stored in the storage circuit 120 (step S1110). When the calculation circuit 110 performs step S930 of FIG. 9 for the first time, step S1110 is determined to be NO because no intermediate result is stored in the storage circuit 120. Next, the calculation circuit 110 retrieves a frame of the video material from the storage circuit 120 (step S1120), selects the first sub-model from the sub-models as the target sub-model, and then inputs the frame into the target sub-model to generate the intermediate result R1 (step S1130). After the calculation circuit 110 stores the intermediate result R1 in the storage circuit 120 (step S1140), step S930 finishes, and the calculation circuit 110 proceeds to perform step S940.

If it is not the first time that the calculation circuit 110 performs the step S930 (YES branch of step S1110), the calculation circuit 110 selects the sub-model immediately succeeding the current target sub-model as the target sub-model (step S1150). The current target sub-model is the target sub-model determined when the calculation circuit 110 last time performed step S930 (i.e., the flow of FIG. 11). For example, when the calculation circuit 110 performs step S930 for the second time, the current target sub-model is the sub-model 1010_1; therefore, the calculation circuit 110 can use the sub-model immediately succeeding the sub-model 1010_1 (i.e., the sub-model 1010_2) in step S1150 as the target sub-model. When the calculation circuit 110 performs step S930 for the $k^{th}$ time, the current target sub-model is the sub-model 1010_$k$–1 (not shown); therefore, the calculation circuit 110 can use the sub-model immediately succeeding the sub-model 1010_$k$–1 (i.e., the sub-model 1010_$k$) in step S1150 as the target sub-model.

After the new target sub-model is determined (i.e., after step S1150 is finished), the calculation circuit 110 reads the previous (i.e., stored last time) intermediate result from the storage circuit 120 and inputs the intermediate result into the target sub-model. More specifically, when performing step S930 for the $k^{th}$ time, the calculation circuit 110 inputs the intermediate result Rk–1 into the sub-model 1010_$k$ in step S1160.

Step S1160 generates an intermediate result (when k n) or the resolution of the frame (when k=n). More specifically, when the target sub-model determined in step S1150 is not the last sub-model of the first AI model 1000, step S1160 generates the intermediate result; when the target sub-model determined in step S1150 is the last sub-model of the first AI model 1000, step S1160 generates the resolution. In other words, after the calculation circuit 110 has performed step S930 multiple times to execute all the sub-models 1010 of the first AI model 1000, the resolution of the frame (i.e., the resolution of the video material) can be obtained. Therefore, when the calculation circuit 110 determines in step S1170 that the output of step S1160 is an intermediate result, the calculation circuit 110 stores the intermediate result in the storage circuit 120 (step S1140), and then step S930 finishes. When the calculation circuit 110 determines in step S1170 that the output of step S1160 is the resolution, the calculation circuit 110 stores or outputs the resolution (step S1180), and then step S930 finishes. In some embodiments, the resolution is, for example, a single value or a string, and the intermediate result is, for example, a set of multiple feature maps, hidden layer outputs, and/or other parameters.

In the embodiment of FIG. 9, the AI model accelerator is shared by multiple tasks. In other words, the electronic device 100 can use the same set of devices, which is a combination of hardware (such as the calculation circuit 110 and the storage circuit 120) and software (i.e., the first and second AI models) to alternately perform resolution detection and object recognition to save costs (e.g., by sharing the calculation circuit 110 and/or using fewer storage circuits). Furthermore, because the resolution detection operation can be divided into multiple sub-operations, the more important main tasks (such as face recognition for safety purposes) are not affected by the resolution detection operation even if the hardware is shared by multiple AI models.

Since a person having ordinary skill in the art can appreciate the implementation detail and the modification thereto of the present method invention through the disclosure of the device invention, repeated and redundant description is thus omitted. Please note that there is no step sequence limitation for the method inventions as long as the execution of each step is applicable. Furthermore, the shape, size, and ratio of any element and the step sequence of any flowchart in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A method of detecting a resolution of a video material, the method being applied to an electronic device, a calculation circuit of the electronic device executing an artificial intelligence (AI) model, the video material comprising a plurality of frames, each frame containing a plurality of sub-frames, the AI model processing a plurality of pixel data to generate an intermediate resolution corresponding to the pixel data, the method comprising:
    (A) generating a target sub-frame, the number of pixels in the target sub-frame being smaller than the number of pixels in any of the frames;
    (B) inputting the target sub-frame into the AI model to generate the intermediate resolution;
    (C) storing the intermediate resolution;
    (D) repeating steps (A) to (C) to generate a plurality of intermediate resolutions; and
    (E) determining the resolution of the video material based on the intermediate resolutions.

2. The method of claim 1, wherein step (D) comprises:
    stopping performing steps (A) to (C) when the number of intermediate resolutions is greater than or equal to a target value.

3. The method of claim 2, wherein the target value is the number of the sub-frames in a same target frame.

4. The method of claim 2, wherein the frames comprise a first frame and a second frame, and two target sub-frames generated in two consecutive steps (A) are respectively selected from the first frame and the second frame.

5. The method of claim 4, wherein the first frame and the second frame are contiguous frames.

6. The method of claim 4, wherein the first frame and the second frame are not contiguous frames.

7. The method of claim 4, wherein two target sub-frames generated in two consecutive steps (A) are respectively selected from a first area of the first frame and a second area of the second frame, and the position of the first area with respect to the first frame is identical to or different from the position of the second area with respect to the second frame.

8. The method of claim 2, wherein the frames comprise a first frame and a second frame, and the target sub-frame generated each time in step (A) comprises a plurality of pixels from the first frame and a plurality of pixels from the second frame.

9. The method of claim 1, wherein step (E) comprises:
    selecting a mode of the intermediate resolutions as the resolution.

10. An electronic device, for detecting a resolution of a video material comprising a plurality of frames, each frame containing a plurality of sub-frames, the electronic device comprising:
    a storage circuit for storing a plurality of program instructions or program codes;
    a calculation circuit, coupled to the storage circuit, wherein the calculation circuit executes the program instructions or program codes to execute an artificial intelligence (AI) model, and the AI model processes a plurality of pixel data to generate an intermediate resolution corresponding to the pixel data, the calculation circuit further executes the program instructions or program codes to perform following steps:
(A) generating a target sub-frame, the number of pixels in the target sub-frame being smaller than the number of pixels in any of the frames;
(B) inputting the target sub-frame into the AI model to generate the intermediate resolution;
(C) storing the intermediate resolution;
(D) repeating steps (A) to (C) to generate a plurality of intermediate resolutions; and
(E) determining the resolution of the video material based on the intermediate resolutions.

11. The electronic device of claim 10, wherein step (D) comprises:
stopping performing steps (A) to (C) when the number of intermediate resolutions is greater than or equal to a target value.

12. The electronic device of claim 11, wherein the target value is the number of the sub-frames in a same target frame.

13. The electronic device of claim 11, wherein the frames comprise a first frame and a second frame, and two target sub-frames generated in two consecutive steps (A) are respectively selected from the first frame and the second frame.

14. The electronic device of claim 13, wherein the first frame and the second frame are contiguous frames.

15. The electronic device of claim 13, wherein the first frame and the second frame are not contiguous frames.

16. The electronic device of claim 13, wherein two target sub-frames generated in two consecutive steps (A) are respectively selected from a first area of the first frame and a second area of the second frame, and the position of the first area with respect to the first frame is identical to or different from the position of the second area with respect to the second frame.

17. The electronic device of claim 11, wherein the frames comprise a first frame and a second frame, and the target sub-frame generated each time in step (A) comprises a plurality of pixels from the first frame and a plurality of pixels from the second frame.

18. The electronic device of claim 10, wherein step (E) comprises:
selecting a mode of the intermediate resolutions as the resolution.

19. A method of detecting a resolution of a video material, the method being applied to an electronic device, the electronic device comprising a calculation circuit and a storage circuit, the storage circuit storing a plurality of program instructions or program codes, the calculation circuit executing the program instructions or program codes to execute a first artificial intelligence (AI) model, the first AI model comprising a plurality of sub-models, the method comprising:
(A) obtaining a frame of the video material;
(B) inputting the frame into a target sub-model of the sub-models to generate a first intermediate result;
(C) storing the first intermediate result;
(D) using the calculation circuit to execute a second AI model;
(E) selecting a sub-model succeeding the target sub-model as the target sub-model;
(F) inputting the first intermediate result into the target sub-model to generate a second intermediate result or the resolution of the video material; and
(G) using the second intermediate result as the first intermediate result and repeating steps (C) to (F) until step (F) generates the resolution of the video material, when step (F) generates the second intermediate result instead of the resolution of the video material.

20. The method of claim 19, wherein the first intermediate result and the second intermediate result comprise a plurality of feature maps of the first AI model, or hidden layer outputs.

* * * * *